United States Patent [19]

Mitsuhashi

[11] Patent Number: 5,215,767
[45] Date of Patent: Jun. 1, 1993

[54] ADDITIVE FOR AQUACULTURE FEED FOR FISH AND SHELLFISH AND AQUACULTURE FEED FOR FISH AND SHELLFISH WHICH CONTAINS SAME

[75] Inventor: Masakazu Mitsuhashi, Okayama, Japan

[73] Assignee: Kabushiki Kaisha Hayashibara Seibutsu Kagaku Kenkyujo, Okayama, Japan

[21] Appl. No.: 844,138

[22] Filed: Mar. 2, 1992

[30] Foreign Application Priority Data

Mar. 16, 1991 [JP] Japan .................. 3-128883

[51] Int. Cl.$^5$ .............................. A23L 1/302
[52] U.S. Cl. .......................... 426/72; 426/2; 426/311; 426/520; 426/805; 426/643
[58] Field of Search ............. 426/72, 2, 311, 805, 426/520, 643

[56] References Cited

U.S. PATENT DOCUMENTS 3,763,009 10/1983 Suzuki et al. ............ 426/311
4,959,483 9/1990 Matsumura et al. ........... 426/72

FOREIGN PATENT DOCUMENTS 0398484 11/1990 European Pat. Off. .

*Primary Examiner*—R. B. Penland
*Attorney, Agent, or Firm*—Leydig, Voit & Mayer

[57] ABSTRACT

An additive for aquaculture feed for fish and shellfish, which contains L-ascorbic acid-2-glucoside as an active ingredient, an aquaculture feed for fish and shellfish containing said additive, and an aquaculture feed for fish and shellfish, which has been added with said additive and granulated. The additive for feed of the present invention, namely, L-ascorbic acid-2-glucoside 1) does not have reducing ability by itself, and extremely stable, 2) can be decomposed into L-ascorbic acid and D-glucose when taken in fish and shellfish, and can exhibit physiological effects inherent to L-ascorbic acid, and 3) is greatly improved in heat resistance and light resistance in comparison with L-ascorbic acid, and shows markedly small loss of L-ascorbic acid activity during the production and storage of feed.

10 Claims, No Drawings

ADDITIVE FOR AQUACULTURE FEED FOR FISH AND SHELLFISH AND AQUACULTURE FEED FOR FISH AND SHELLFISH WHICH CONTAINS SAME

FIELD OF THE INVENTION

The present invention relates to an additive for the aquaculture feed for fish and shellfish including fishes such as rainbow trout, channel catfish, coho salmon, young yellowtail and striped beakperch and crustaceans such as kuruma prawn, giant tiger shrimp, Oriental river prawn and swimming crab, to an aquaculture feed for fish and shellfish which contains same, and to a method for the treatment or prevention of the failure of connective tissue in fish and shellfish.

BACKGROUND OF THE INVENTION

Along with the increase of aquaculture of fish, there have been many investigations into the vitamin requirements of aquacultured fish. As a result, it has been found that vertebral lordosis, vertebral scoliosis, and fracture and dislocation of vertebra occur in rainbow trout, channel catfish, coho salmon, young yellowtail, striped beakperch, etc. fed with L-ascorbic acid (vitamin C) deficient feed, and that bleeding in fins and jaws, and damage of gill cover occur in Japanese eel fed with said feed.

The symptom common to those L-ascorbic acid deficient fish is the failure of connective tissue. In order to prevent the symptom, vitamins including L-ascorbic acid are added in the feed for fish rearing, and fed to fish (for example, Japanese Patent Publication No. 2195/1973 and Japanese Patent Publication No. 12573/1988).

Nevertheless, L-ascorbic acid is particularly unstable among water soluble vitamins, and the decrease of the activity of L-ascorbic acid by decomposition when added with fish meal and minerals in feed is left to be solved.

The required amount of L-ascorbic acid has been investigated, and found to be 10–20 mg/kg feed at minimum.

In the meantime, the aquaculture of crustaceans such as kuruma prawn, giant tiger shrimp, Oriental river prawn and swimming crab has been increasing in recent years. The ascorbic acid requirement of crustaceans has also been investigated, and found to be, for example, 300–1000 mg/100 g feed on the L-ascorbic acid basis for young kuruma prawn.

The crustaceans are incapable of synthesizing L-ascorbic acid, and need to take it from feed. To meet this demand, feed for the aquaculture of crustacean, which contains L-ascorbic acid is being marketed.

This feed, however, is heat-processed at 100° C. or more during pelleting, and L-ascorbic acid added in the feed is decomposed to a considerable extent.

In addition, prawns hold and gnaw feed by nature. Since prawns take extended time to eat in this way, the dissolution of L-ascorbic acid from feed becomes great, and it is said in one report that after all, only 1/10 of the administered amount can be taken in after destruction during the production and storage of feed.

Another report says that the survival rate of crustaceans such as kuruma prawn shows a drastic fall when they are fed with L-ascorbic acid deficient feed.

Although the feed on the market is produced with an excessive amount of L-ascorbic acid charged in before pelleting, L-ascorbic acid is easily decomposed not only by heat but also by metals such as copper in fish meal and feed, and more than 70% of the amount added is decomposed during the production of the feed. Moreover, L-ascorbic acid has poor stability during storage of feed.

SUMMARY OF THE INVENTION

For the purpose of solving the problems of the above-mentioned L-ascorbic acid, the present inventor has conducted intensive studies of the aquaculture feed for fish and shellfish which is stable and has L-ascorbic acid activities, and found that the use of 2-O-α-D-glucopyranosyl-L-ascorbic acid (to be referred to as L-ascorbic acid-2-glucoside in the present specification) as disclosed in EP 0398484 A2 permits stable retention of the activity of ascorbic acid added in the aquaculture feed for fish and shellfish, and that the feed added with L-ascorbic acid-2-glucoside permits full display of bioactivity of L-ascorbic acid, which resulted in the completion of the present invention.

DETAILED DESCRIPTION OF THE INVENTION

The present invention relates to an additive for the feed for the aquaculture of fish and shellfish, which contains L-ascorbic acid-2-glucoside as an active ingredient, to an aquaculture feed for fish and shellfish containing same, and to a method for the treatment or prevention of the failure of connective tissue in fish and shellfish.

Here, the fish and shellfish include not only fresh water fishes and marine fishes but crustaceans, namely, all fishes and crustaceans which can be the subject of aquaculture. Examples of the fish include rainbow trout, kokanee, channel catfish, ayu fish, masu trout, Japanese char, Japanese eel, tilapia, carp, young yellowtail, red sea bream, striped beakperch, olive flounder, coho salmon, masu salmon, king salmon, Atlantic salmon, etc., and examples of the crustacean include kuruma prawn, Oriental shrimp, giant tiger shrimp, oriental river prawn, swimming crab, offshore greasy back prawn, green tiger prawn, stone crab, etc.

The L-ascorbic acid-2-glucoside of the present invention is a derivative of L-ascorbic acid, which has the structure of the following formula wherein α-D-glucose is bound at the 2-position of L-ascorbic acid, and can be synthesized by transglycosidation of a base material of L-ascorbic acid, and cyclodextrin, maltotetraose, maltopentaose, dextrin, amylose, amylopectin or glycogen, with an enzyme derived from microbes belonging to the genus Bacillus such as CGTase (cyclomaltodextrin glucanotransferase), rice seed α-glucosidase, or the like.

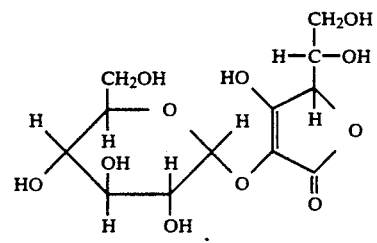

The L-ascorbic acid-2-glucoside thus produced is different from L-ascorbic acid and is extremely stable, and hardly causes Maillard reaction. The L-ascorbic acid-2-glucoside is easily decomposed into L-ascorbic acid and D-glucose by α-glucosidase in the body, and exhibits physiological activities inherent to L-ascorbic acid.

The additive of the present invention can be contained in the aquaculture feed for fish and shellfish by directly adding L-ascorbic acid-2-glucoside to feed. If necessary, for example, L-ascorbic acid-2-glucoside may be mixed with one or more of the feed materials such as saccharides, proteins, vitamins, minerals, etc., after which the rest of the feed materials are added thereto to give a feed, or L-ascorbic acid-2-glucoside may be added with one or more of those feed materials and granulated, whereafter the rest of the feed materials which have been granulated are added thereto to give a feed.

Since L-ascorbic acid-2-glucoside is susceptible to disadvantageous decomposition by the action of α-glucosidase contained in feed materials such as ground grain and fish paste, and easily converted into unstable L-ascorbic acid, it is desirable to avoid unfavorable decomposition of L-ascorbic acid-2-glucoside during production and subsequent storage of feed, by employing a method comprising heating these feed materials in advance to deactivate α-glucosidase, or a method comprising separately granulating the feed materials to be added with L-ascorbic acid-2-glucoside and the feed materials containing α-glucosidase, and then mixing them.

The additive of the present invention can be added in various feed materials by conventional methods.

The feed in which the additive of the present invention is to be added is preferably exemplified by mixed feeds including marketed ones for fish, which contain protein materials such as fish meal, meat meal, defatted soybean, and wheat gluten, carbohydrate materials such as wheat flour, starch, and corn flour, fats and oils such as soybean oil, cod liver oil, and squid liver oil, vitamins such as thiamine nitrate, thiamine hydrochloride, riboflavin, pyridoxine hydrochloride, nicotinic acid amide, calcium pantothenate, and folic acid, minerals such as $KH_2PO_4$ and calcium lactate, antioxidants, colorants, flavoring agents, enzymes, emulsifiers, caking additives, and so on mixed as appropriate. Examples thereof include a mixed feed for olive flounder produced by Kabushiki Kaisha Higashimaru and Horse Mackerel Crumble Feed produced by Nisshin Feed Co., Ltd.

As the feed for crustaceans, preferred are mixed feeds including marketed ones which contain protein materials such as fish meal, meat meal, squid meal, krill meal, casein, albumin, defatted soybean, and wheat gluten, carbohydrate materials such as wheat flour, starch, and corn flour, fats and oils such as soybean oil, cod liver oil, and squid liver oil, vitamins such as thiamine nitrate, thiamine hydrochloride, riboflavin, pyridoxine hydrochloride, nicotinic acid amide, calcium pantothenate, and folic acid, minerals such as $KH_2PO_4$, calcium lactate and $MgSO_4$, antioxidants, colorants, flavoring agents, enzymes, emulsifiers; caking additives, and so on mixed as appropriate. Examples thereof include a mixed feed for kuruma prawn produced by Kabushiki Kaisha Higashimaru.

The feeds mentioned above are a few examples, and should not be construed as limitative. The additive of the present invention can be applied to a wider range of feed for the aquaculture of fish and shellfish.

The feed added with the additive of the present invention may be used as it is upon thorough mixing, or may be granulated by an extruder, heat-dried as necessary and formed into a suitable form by conventional methods, after which fed to fish and shellfish during aquaculture. The granulated feed is particularly superior in storage stability, and easiness of handling and feeding. In addition, the granulated feed can be made to float on the water, or not to sink to the water bottom, or the like by changing the kind of starting materials and modifying granulating steps, thereby to prevent environmental pollution.

While the amount of the L-ascorbic acid-2-glucoside of the present invention to be added varies depending on the kind of feed materials to be contained together and target fish and shellfish, it is normally not less than 2 mg and not more than 50 g, preferably from 10 mg to 40 g, and more preferably from 100 mg to 20 g per 1 kg of feed in terms of physiological effects and economical efficiency.

The additive for the aquaculture feed for fish and shellfish and the aquaculture feed for fish and shellfish containing same, of the present invention have the following advantageous features. 1) They are extremely stable against air oxidation, in aqueous solutions, and in the presence of iron and copper ions, since the additive has the structure wherein the glucose is bound at the 2-position of L-ascorbic acid. 2) While the additive lacks reducing ability it can be decomposed into L-ascorbic acid and glucose by the actions of α-glucosidase present in the living body when taken in fish and shellfish, and exhibit the same physiological activities as those of L-ascorbic acid. 3) The additive has greatly improved heat resistance and light resistance in comparison with L-ascorbic acid, and shows markedly small loss of L-ascorbic acid titer during the production and storage of feed.

Besides, they permit sufficient display of the physiological activities in the body after taken into fish and shellfish.

The present invention is hereinbelow described in detail by illustrating working examples to which the invention is not limited.

EXAMPLE 1

The basic feed for prawns as shown in Table 1 was used as an L-ascorbic acid deficient feed, and 5 g of L-ascorbic acid, 9.6 g of the L-ascorbic acid-2-glucoside of the present invention (5 g as L-ascorbic acid), and 6.2 g of calcium L-ascorbate (5 g as L-ascorbic acid) were added respectively in 1 kg of the basic feed, followed by pulverization. After mixing, the moisture content of the mixture was adjusted to 35%, and the mixture was granulated by an extrusion granulator. After dry heating under the conditions shown in Table 2, the residual rate of L-ascorbic acid, etc. was measured.

The feed was stored at room temperature or at 40° C. under the relative humidity (hereinafter referred to as RH) of 75% to observe the time course change of L-ascorbic acid, etc.

The residual rate of L-ascorbic acid, etc. was measured by high performance liquid chromatography (hereinafter abbreviated as HPLC). The contained amount of L-ascorbic acid, etc. was measured at the initiation of storage and at the time of the measurement, and is expressed in a percentage of the amount at the time of the measurement to that at the initiation of storage. The residual rate was estimated in the same manner for L-ascorbic acid and its derivatives.

TABLE 1

| Composition of the basic feed for prawns (part by weight) | | | |
|---|---|---|---|
| Squid Meal (Nippon Suisan Kaisha Ltd.) | 30.00 | | |
| North Pacific White Fish Meal (Taiyo Fishery Company) | 15.00 | | |
| casein | 10.00 | | |
| albumin | 5.00 | | |
| Krill Meal (Nippon Suisan Kaisha Ltd.) | 5.00 | | |
| dextrin | 6.60 | | |
| fats and oils for feed (Riken Vitamin Co., Ltd.) | 7.00 | | |
| soybean lecithin | 3.00 | | |
| cholesterol | 0.50 | | |
| vitamin mix*[1] | 1.84 | | |
| mineral mix*[2] | 6.00 | | |
| sodium citrate | 0.50 | | |
| sodium succinate | 0.50 | | |
| glucosamine hydrochloride | 0.40 | | |
| gluten for feed | 8.00 | | |
| p-aminobenzoic acid | 15.80 | cyanocobalamin | 0.13 |
| biotin | 0.63 | folic acid | 1.26 |
| inositol | 632.00 | choline chloride | 984.00 |
| nicotinic acid amide | 63.20 | menadione | 6.34 |
| calcium pantothenate | 94.80 | β-carotene | 15.17 |
| pyrdoxine hydrochloride | 18.96 | α-tocopherol | 31.60 |
| riboflavin | 12.64 | calciferol | 1.88 |
| thiamine hydrochloride | 6.32 | | |
| $K_2HPO_4$ | 1.403 | | |
| $Ca_3(PO_4)_2$ | 1.909 | | |
| $MgSO_4.7H_2O$ | 2.134 | | |
| $NaH_2PO_4.2H_2O$ | 0.554 | | |

*[1] vitamin mix (mg. per 1.84 g)
*[2] mineral mix (g, per 6.00 g)

The measurement results are summarized in Table 2. The plot added with the additive of the present invention was stabler against heating than the plots respectively added with L-ascorbic acid and calcium L-ascorbate, and was confirmed to be also stable during the subsequent time course observation.

TABLE 2

| | | L-ascorbic acid residual rate (%) | |
|---|---|---|---|
| Experimental plot | | room temp. plug sealed | 40° C., RH 75% |
| L-ascorbic acid 2 glucoside | mixing w/o heating I | 95.7 | |
| | after heating II* | 88.6 | 88.6 |
| | 15 days later | 86.5 | 74.8 |
| | 30 days later | 84.7 | 67.4 |
| | 45 days later | 85.1 | 66.0 |
| L-ascorbic acid | mixing w/o heating I | 51.3 | |
| | after heating II* | 10.0 | 10.0 |
| | 15 days later | 7.7 | 7.5 |
| | 30 days later | 5.7 | 5.0 |
| | 45 days later | 5.3 | 3.0 |
| calcium L-ascorbate | mixing w/o heating I | 69.9 | |
| | after heating II* | 15.0 | 15.0 |
| | 15 days later | 11.6 | 11.3 |
| | 30 days later | 8.6 | 7.5 |
| | 45 days later | 8.0 | 4.5 |

I* 40° C., 750 mmHg or more, 16 hrs, dried under reduced pressure
II* 110° C., after 10 minutes' heating, dried under reduced pressure

EXAMPLE 2

Each granulated feed experimentally prepared in the same composition as in Example 1 was dried at 40° C. for 7 hours in an oven, and heated in an autoclave (110° C., 3 minutes). The dried feed was immersed in seawater at 25° C. for 1, 3 or 6 hours, and the residual rate of L-ascorbic acid, etc. was measured. The results are summarized in Table 3.

TABLE 3

| Residual rate of L-ascorbic acid and its derivatives in feed after immersion in seawater (%) | | | | |
|---|---|---|---|---|
| | immersion time | | | |
| Experimental plot | 0 hr | 1 hr | 3 hr | 6 hr |
| L-ascorbic acid | 32 | 13 | 9 | 7 |
| L-ascorbic acid-2-glucoside | 89 | 61 | 49 | 35 |
| calcium L-ascorbate | 52 | 16 | 8 | 7 |

The plot added with the additive of the present invention evidently showed greater residual rate after immersion in seawater in comparison with the plots respectively added with L-ascorbic acid and calcium L-ascorbate, and it was confirmed that the additive of the present invention was advantageous for prawns such as kuruma prawn which take a long time for the intake of feed.

EXAMPLE 3

The premixed mixtures of vitamins and minerals as shown in Table 4 (2 g, group A 1 g plus group B 1 g) were mixed respectively with L-ascorbic acid-2-glucoside of the present invention, L-ascorbic acid, and calcium L-ascorbate (50 mg each), and stored at 40° C. and under 75% RH for two weeks. The residual rate of L-ascorbic acid, etc. was measured by HPLC, the results of which are summarized in Table 5.

TABLE 4

| group A added with vitamins, without L-ascorbic acid | | | |
|---|---|---|---|
| (In 100 g of vitamin mixture) | | | |
| vitamin A acetate | 46,600 IU | cyanocobalamin | 0.2 mg |
| calciferol | 23,300 IU | D-biotin | 1 mg |
| α-tocopherol | 1,200 mg | folic acid | 2 mg |
| menadione | 6 mg | calcium pantothenate | 235 mg |
| thiamine hydrochloride | 59 mg | nicotinic acid amide inositol | 294 mg 1,176 mg |
| riboflavin | 59 mg | lactose | residual amount |
| pyridoxine hydrochloride | 29 mg | | |
| Group B mineral mixture composition (g) | | | |
| $CaHPO_4.2H_2O$ | 0.43 | $MnSO_4.4-5H_2O$ | 0.121 |
| $KH_2PO_4$ | 34.31 | $CuSO_4.5H_2O$ | 0.156 |
| NaCl | 25.06 | KI | 0.0005 |
| iron citrate | 0.623 | $CaCO_3$ | 29.29 |
| $MgSO_4.7H_2O$ | 9.98 | $(CH_4)_6Mo_7O_{24}.4H_2O$ | 0.0025 |
| $ZnCl_2$ | 0.02 | TOTAL | 99.993 |

TABLE 5

| | Residual rate (%) | |
|---|---|---|
| Experimental plot | 1 week | 2 weeks |
| L-ascorbic acid-2-glucoside | 98.9 | 96.3 |
| L-ascorbic acid | 17.0 | 0.9 |
| calcium L-ascorbate | 17.0 | 0.8 |

From the Tables given above, it was confirmed that the additive of the present invention was markedly stable in the vitamin mineral mixture as compared with L-ascorbic acid and calcium L-ascorbate.

EXAMPLE 4

The basic feed for yellowtail larva as shown in Table 6 was used as an L-ascorbic acid deficient feed, and 124 mg of calcium L-ascorbate (100 mg as L-ascorbic acid) and 192 mg of L-ascorbic acid-2-glucoside (100 mg as L-ascorbic acid) were added respectively to 1 kg of the basic feed, which was then used as the feed for experimental plot. The feed was prepared just before each administration.

TABLE 6

| Composition of the basic feed (part by weight) | | | |
|---|---|---|---|
| North Pacific White Fish Meal (Taiyo Fishery Company) | 68.0 | | |
| activated wheat gluten | 7.0 | | |
| liver powder-L (Riken Vitamin Co., Ltd.) | 3.0 | | |
| guar gum | 2.0 | | |
| wheat flour | 13.95 | | |
| bile powder (33%) | 0.05 | | |
| Toarase (enzyme mix prepared by Toa Kagaku) | 0.5 | | |
| vitamin mix*3 | 3.0 | | |
| mineral mix A*4 | 2.0 | | |
| mineral mix B*5 | 0.5 | | |
| thiamine nitrate | 2.40 | folic acid | 2.40 |
| riboflavin | 4.40 | choline chloride | 75.00 |
| pyridoxine hydrochloride | 2.40 | cyanocobalamin | 0.032 |
| nicotinic acid amide | 7.20 | α-tocopherol | 60.00 |
| calcium pantothenate | 14.00 | vitamin A | 1,500 (IU) |
| inositol | 60.00 | calciferol | 300 (IU) |
| biotin | 0.4 | menadione | 3.00 |
| $KH_2PO_4$ | 205 | calcium lactate | 141 |
| $Ca(H_2PO_4).H_2O$ | 305 | $FeSO_4.7H_2O$ | 50 |
| $ZnSO_4.H_2O$ | 5.5 | $KIO_3$ | 0.05 |
| $MnSO_4$ | 3.2 | $CoCi_2.6H_2O$ | 0.025 |
| $CuSO_4.5H_2O$ | 1.0 | | |

*3vitamin mix (mg, per 3.0 g)
*4mineral mix A (mg, per 2.0 g)
*5mineral mix B (mg, per 0.5 g)

Yellowtail larvae were divided into three experimental plots (225 per group) including a control plot to which L-ascorbic acid was not fed, and reared for 4 weeks (feeding rate: 3.5%, feeding: twice a day).

The average body weight of the yellowtail larvae in each plot was weighed with time intervals. In addition, the survival rate and weight gain of the yellowtails larvae in each plot were determined, the results of which are shown in Table 7.

TABLE 7

| Experimental plot | day 14 | | day 28 | |
|---|---|---|---|---|
| | survival rate (%) | weight gain (%) | survival rate (%) | weight gain (%) |
| without L-ascorbic acid | 96.4 | 32 | 45.8 | 56.7 |
| L-ascorbic acid-2-glucoside | 96.4 | 51.7 | 89.8 | 112.4 |
| calcium L-ascorbate | 98.2 | 52.5 | 91.6 | 122.6 |

The results show that the yellowtail larvae of the plot without L-ascorbic acid were evidently poor in survival rate and poor in weight gain after 28 days of aquaculture, in comparison with the other two plots.

The plot added with the L-ascorbic acid-2-glucoside of the present invention showed almost the same survival rate and weight gain as of the plot added with calcium L-ascorbate, and it was confirmed that the L-ascorbic acid-2-glucoside exerted sufficient physiological effects of L-ascorbic acid on the yellowtail larvae.

EXAMPLE 5

The basic feed for rainbow trout as shown in Table 8 was used as an L-ascorbic acid deficient feed, and water was added to 1 kg of the basic feed to make the proportion of the water 8 w/w %. Calcium L-ascorbate 300 mg (242 mg as L-ascorbic acid), and 300 mg of L-ascorbic acid-2-glucoside (156 mg as L-ascorbic acid) were respectively added homogeneously. After granulation and drying at a temperature between 60° C. and 70° C. for about 20 minutes, the feed was used for the experiment.

About 60 young coho salmons weighing from 10 to 20 g were preliminarily reared for two weeks with a feed without L-ascorbic acid, and divided into two plots. To one plot was fed a mixed feed added with calcium L-ascorbate, and to the other plot was fed a mixed feed added with L-ascorbic acid-2-glucoside, and they were reared for two more weeks. The L-ascorbic acid content in the extracted sites from coho salmon, namely, a liver and blood was measured by HPLC, the results of which are shown in Table 9.

As is evident from the results in Table 9, the plots of coho salmon fed with calcium L-ascorbate and L-ascorbic acid-2-glucoside respectively, showed similar L-ascorbic acid content in the liver and in blood.

While the amount of L-ascorbic acid added in the feed fed to the coho salmon in the L-ascorbic acid-2-glucoside plot was only about ⅔ the amount fed to the calcium L-ascorbate plot, the results obtained were similar for both. This means that L-ascorbic acid-2-glucoside has excellent stability in comparison with calcium L-ascorbate not only during production of feed but also thereafter until coho salmon takes the feed, and that after the intake, L-ascorbic acid-2-glucoside is easily converted to L-ascorbic acid in the body and sufficiently exerts physiological effects inherent to L-ascorbic acid.

TABLE 8

| Composition of the basic feed (part by weight) | | |
|---|---|---|
| fish meal | 67.0 | |
| wheat flour | 30.0 | |
| vitamin mix*1 | 1.0 | |
| mineral mix*2 | 2.0 | |
| antioxidant (ethoxyquin) | 0.01 | |
| thiamine nitrate | 3.06 | |
| riboflavin | 10.42 | |
| pyridoxine hydrochloride | 2.04 | |
| nicotinic acid | 40.40 | |
| calcium D-pantothenate | 14.29 | |
| inositol | 206.19 | |
| biotin (1% product) | 90.00 | |
| folic acid (9% product) | 8.33 | |
| p-aminobenzoic acid | 20.20 | |
| choline chloride (50% product) | 400.00 | |
| dl-α-tocopherol acetate (50% product) | 40.00 | |
| β-carotene (10% product) | 6.00 | |
| menadione sodium hydrogensulfite | 4.00 | |
| calciferol | 900 (IU) | |
| cyanocobalamin (0.1% product) | 4.50 | |
| beer yeast | 209.67 | |
| NaCl | 86.49 | $AlCl_3.6H_2O$ | 0.98 |
| $MgSO_4.7H_2O$ | 272.40 | $ZnSO_4.7H_2O$ | 7.10 |
| $NaH_2PO_4.2H_2O$ | 173.38 | CuCl | 0.22 |
| $KH_2PO_4$ | 476.80 | $MnSO_4.4-6H_2O$ | 1.59 |
| $Ca(H_2PO_4)_2.H_2O$ | 270.01 | $KIO_3$ | 0.34 |
| iron citrate | 59.05 | $CoCl_2.6H_2O$ | 2.09 |
| calcium lactate | 650.18 | | |

*1vitamin mix (mg, per 1.0 g)
*2mineral mix (mg, per 2.0 g)

TABLE 9

| | L-ascorbic acid content in the body (ppm) | | | | | |
|---|---|---|---|---|---|---|
| Experimental plot | extract site | initiation of test | day 2 | day 7 | day 11 | day 15 |
| calcium L-ascorbate | liver | 61 | 90 | 90 | 190 | 139 |
| | blood | 10 | — | 27 | — | 17 |
| L-ascorbic acid-2-glucoside | liver | 61 | 117 | 93 | 162 | 160 |
| | blood | 10 | — | 23 | — | 15 |

EXAMPLE 6

A mixed feed of the composition of Table 10 without L-ascorbic acid was fed to aquacultured red sea breams of an average weight of 430 g for two weeks, after which calcium L-ascorbate and L-ascorbic acid-2-glucoside were forcibly fed respectively in an amount corresponding to 20 mg/kg of L-ascorbic acid to examine availability of the L-ascorbic acid (water temperature: 28.0°–28.5° C.).

Lactose was added to each of L-ascorbic acid, etc. to give a 10-fold powder, and 8.6 g therefrom and 57.4 g of a feed (fish meal 70%, wheat flour 20%, and alpha potato starch 10%, passed through a 100 mesh sieve) were mixed. Tap water (134 ml) was added thereto to give a homogeneously kneaded paste, and the paste was filled in a resin syringe equipped with a metal sonde and fed into stomach at 2 g per one red sea bream.

At two hours from the feeding, 6 red sea breams were selected from each plot, samples for quantitative determination were taken, and L-ascorbic acid, etc. were analyzed. The results are shown in Table 11.

TABLE 10

| Compostion of the mixed feed (part by weight) | | | |
|---|---|---|---|
| North Pacific White Fish Meal (Taiyo Fishery Company) | 68.0 | | |
| activated wheat gluten | 7.0 | | |
| liver powder-L (Riken Vitamin Co., Ltd.) | 3.0 | | |
| guar gum | 2.0 | | |
| wheat flour | 13.95 | | |
| bile powder (33%) | 0.05 | | |
| Toarase (enyzyme mix produced by Toa Kagaku) | 0.5 | | |
| vitamin mix[6] | 3.0 | | |
| mineral mix A[7] | 2.0 | | |
| mineral mix B[8] | 0.5 | | |
| thiamine nitrate | 2.40 | folic acid | 2.40 |
| riboflavin | 4.40 | choline chloride | 75.00 |
| pyridoxine hydrochloride | 2.40 | cyanocobalamin | 0.032 |
| nicotinic acid amide | 7.20 | α-tocopherol | 60.00 |
| calcium pantothenate | 14.00 | vitamin A | 1,500 (IU) |
| inositol | 60.00 | calciferol | 300 (U) |
| biotin | 0.14 | menadione | 3.00 |
| $KH_2PO_4$ | 205 | calcium lactate | 141 |
| $Ca(H_2PO_4)\cdot H_2O$ | 305 | $FeSO_4\cdot 7H_2O$ | 20 |
| $ZnSO_4\cdot H_2O$ | 5.5 | $KIO_3$ | 0.05 |
| $MnSO_4$ | 3.2 | $CoCl_2\cdot 6H_2O$ | 0.025 |
| $CuSO_4\cdot 5H_2O$ | 1.0 | | |

[6]vitamin mix (mg. per 3.0 g)
[7]mineral mix A (mg. per 2.0 g)
[8]mineral mix B (mg. per 0.5 g)

TABLE 11

Concentration of L-ascorbic acid in blood and in liver of red sea bream

| Experimental plot | 2 hours | |
|---|---|---|
| | blood | liver |
| added with calcium L-ascorbate | 4.3 ± 0.6 | 36.3 ± 3.5 |
| added with L-ascorbic acid-2-glucoside | 4.0 ± 0.7 | 30.5 ± 3.3 | concentration of the fish group (7 in average) fed with no L-ascorbic acid:blood 1.9 ppm, liver 7.1 ppm The L-ascorbic acid concentrations (ppm) in blood and in the liver measured by pooling two samples from red sea breams (six from each group) were higher for the plots added with calcium L-ascorbate and L-ascorbic acid-2-glucoside respectively, than those of the red sea breams added with no ascorbic acid, and there was no difference between the former two plots. The L-ascorbic acid-2-glucoside is similarly absorbed as is calcium L-ascorbate and used in the form of L-ascorbic acid.

EXAMPLE 7

The basic feed for prawns as shown in Table 12 was used as an L-ascorbic acid deficient feed, and 3 g of L-ascorbic acid, 5.8 g of the L-ascorbic acid-2-glucoside of the present invention (3 g as L-ascorbic acid), and 3.7 g of calcium L-ascorbate (3 g as L-ascorbic acid) were respectively added in 1 kg of the basic feed, followed by mixing. The moisture content of the mixture was adjusted to 35%, and the mixture was granulated by an extrusion granulator, whereafter dry heated at 110° C. for 10 minutes, and dried under reduced pressure at 40° C. for use as a feed for experiment. The kuruma prawns were fed with this feed, and weight gain and survival rate were determined, the results of which are shown in Table 13 and Table 14.

TABLE 12

| Composition of the basic feed for prawns (part by weight) | | | |
|---|---|---|---|
| Squid Meal (Nippon Suisan Kaisha Ltd.) | 30.00 | | |
| North Pacific White Fish Meal (Taiyo Fishery Company) | 15.00 | | |
| casein | 10.00 | | |
| albumin | 5.00 | | |
| Krill Meal (Nippon Suisan Kaisha Ltd.) | 5.00 | | |
| dextrin | 6.60 | | |
| fats and oils for feed (Riken Vitamin Co., Ltd.) | 7.00 | | |
| soybean lecithin | 3.00 | | |
| cholesterol | 0.50 | | |
| vitamin mix[9] | 1.84 | | |
| mineral mix[10] | 6.00 | | |
| sodium citrate | 0.50 | | |
| sodium succinate | 0.50 | | |
| glucosamine hydrochloride | 0.40 | | |
| gluten for feed | 8.00 | | |
| p-aminobenzoic acid | 15.80 | cyanocobalamin | 0.13 |
| biotin | 0.63 | folic acid | 1.26 |
| inositol | 632.00 | choline chloride | 948.00 |
| nicotinic acid amide | 63.20 | menadione | 6.32 |
| calcium pantothenate | 94.80 | β-carotene | 15.17 |
| pyridoxine hydrochloride | 18.96 | α-tocopherol | 31.60 |
| riboflavin | 12.64 | calciferol | 1.88 |
| thiamine hydrochloride | 6.32 | | |
| $K_2HPO_4$ | 1.403 | | |
| $Ca_3(PO_4)_2$ | 1.909 | | |
| $MgSO_4\cdot 7H_2O$ | 2.134 | | |
| $NaH_2PO_4\cdot 2H_2O$ | 0.554 | | |

[9]vitamin mix (mg. per 1.84 g)
[10]mineral mix (g. per 6.00 g)

TABLE 13

| | Weight gain (%) | | | | | |
|---|---|---|---|---|---|---|
| | Rearing days | | | | | |
| Experimental plot | 0 | 10 | 20 | 30 | 40 | 50 |
| without L-ascorbic acid | 0 | 26 | 62 | 120 | 176 | 222 |
| L-ascorbic acid-2-glucoside | 0 | 28 | 88 | 152 | 252 | 340 |
| L-ascorbic acid | 0 | 36 | 74 | 130 | 214 | 282 |
| calcium L-ascorbate | 0 | 24 | 72 | 127 | 204 | 284 | weight gain (%) = $(W_2 - W_1)/W_1 \times 100$
$W_1$:average body weight of kuruma prawns at the initation of the experiment
$W_2$:average body weight of kuruma prawns at every 10th day of the experiment

TABLE 14

| | Survival rate (%) | | | | | |
|---|---|---|---|---|---|---|
| | Rearing days | | | | | |
| Experimental plot | 0 | 10 | 20 | 30 | 40 | 50 |
| without L-ascorbic acid | 100 | 85 | 69 | 69 | 69 | 69 |
| L-ascorbic acid-2-glucoside | 100 | 100 | 100 | 100 | 100 | 100 |
| L-ascorbic acid | 100 | 92 | 85 | 85 | 85 | 85 |
| calcium L-ascorbate | 100 | 100 | 92 | 92 | 92 | 92 | survival rate (%) = $N_2/N_1 \times 100$
$N_1$:number of live kuruma prawns at the initiation of the experiment
$N_2$:number of live kuruma prawns at every 10th day of the experiment From the experiment results given above, it was confirmed that L-ascorbic acid-2-glucoside was superior to other L-ascorbic acid derivatives in both the weight gain and survival rate.

EXPERIMENT 8

Prior to the experiment, fingerlings of channel catfish were preliminarily fed with a mixed feed without L-ascorbic acid (Table 15) for two weeks. Then, the fingerlings of channel catfish weighing about 5 g were reared in 6 experimental plots as shown in Table 16, each containing 20 of the fingerlings of channel catfish in a 120 l-water tank, for 16 weeks, and weight gain, feed conversion ratio, and L-ascorbic acid contents in the liver and the kidney were measured.

TABLE 15

| Composition of the mixed feed (part by weight) | | | |
|---|---|---|---|
| North Pacific White Fish Meal (Taiyo Fishery Company) | 12.00 | | |
| soybean powder | 54.50 | | |
| corn flour | 30.80 | | |
| calcium triphosphate | 1.00 | | |
| soybean oil | 1.50 | | |
| vitamin mix*[11] | 1.00 | | |
| mineral mix*[12] | 0.046 | | |
| thiamine nitrate | 1.40 | choline chloride | 39.00 |
| riboflavin | 1.30 | retinol acetate | 0.44 |
| pyridoxine hydrochloride | 1.30 | cholecalciferol | 0.0055 |
| calcium pantothenate | 3.80 | α-tocopherol acetate | 6.60 |
| nicotinic acid | 8.80 | menadione | 0.44 |
| folic acid | 0.22 | cellulose powder | 36.70 |
| cyanocobalamin | 0.01 | | |
| cobalt carbonate | 0.01 | | |
| CaI$_2$ × $_x$H$_2$O | 0.33 | | |
| ZnO | 25.00 | | |
| MnO$_2$ | 4.00 | | |
| FeSO$_4$.7H$_2$O | 15.00 | | |
| CuSO$_4$.5H$_2$O | 2.00 | | |

*[11]vitamin mix (mg/100 g dry diet)
*[12]mineral mix (mg/100 g dry diet)

TABLE 16

| Experimental plots for the aquaculture of American catfish | |
|---|---|
| 1. without L-ascorbic acid | (0) |
| 2. added with ethylcellulose coated ascorbic acid* 61.2 mg/kg diet (60 mg/kg diet as L-ascorbic acid) | (EC-60) |
| 3. added with ethylcellulose coated ascorbic acid* 155.9 mg/kg diet (150 mg/kg diet as L-ascorbic acid) | (EC-150) |
| 4. added with L-ascorbic acid 2-glucoside 115.2 mg/kg diet (60 mg/kg diet as L-ascorbic acid) | (AAG60) |
| 5. added with L-ascorbic acid-2-glucoside 288.0 mg/kg diet (150 mg/kg diet as L-ascorbic acid) | (AAG150) |
| 6. added with L-ascorbic acid-2-glucoside 9,600.0 mg/kg diet (5,000 mg/kg diet as L-ascorbic acid) | (AAG5000) |

*L-ascorbic acid content:98%

The results of the experiment are shown in Table 17.

TABLE 17

| Experimental plot | Weight gain (%) | Feed conversion ratio | L-ascorbic acid content (μg/g) | |
|---|---|---|---|---|
| | | | liver | kidney |
| 1. 0 | 160 | 5.8 | 1.8 | 1.6 |
| 2. EC-60 | 983 | 1.5 | 10.0 | 10.4 |
| 3. EC-150 | 1,089 | 1.4 | 40.0 | 45.4 |
| 4. AAG60 | 913 | 1.6 | 15.9 | 16.6 |
| 5. AAG150 | 1,085 | 1.5 | 42.4 | 55.1 |

TABLE 17-continued

| Experimental plot | Weight gain (%) | Feed conversion ratio | L-ascorbic acid content (μg/g) | |
|---|---|---|---|---|
| | | | liver | kidney |
| 8. AAG5,000 | 1,095 | 1.4 | 322.4 | 160.3 | weight gain (%) = (W$_2$ − W$_1$)/W$_1$ × 100
W$_1$:average body weight of channel catfish at the initiation of the experiment
W$_2$:average body weight of channel catfish at the end of the experiment
feed conversion ratio = intake amount/weight increase The results given above show that the plots added with L-ascorbic acid-2-glucoside exhibited almost the same weight gain, feed conversion ratio, and L-ascorbic acid content in the liver and the kidney as those of the plots added with ethylcellulose coated L-ascorbic acid and were evidently superior to the plot added with no L-ascorbic acid.

What is claimed is:

1. An aquaculture feed for fish and shellfish, which consists essentially of L-ascorbic acid-2-glucoside and a feed material in which α-glucosidase has been deactivated, by heating said feed material the amount of the L-ascorbic acid-2-glucoside being from about 2 mg to about 50 g per kg of said aquaculture feed.

2. An aquaculture feed for fish and shellfish according to claim 1, wherein the fish and shellfish are fishes selected from the group consisting of rainbow trout, kokanee, channel catfish, ayu fish, masu trout, Japanese char, Japanese eel, tilapia, carp, young yellowtail, red sea bream, striped beakperch, olive flounder, coho salmon, masu salmon, king salmon and Atlantic salmon, and crustaceans selected from the group consisting of kuruma prawn, Oriental shrimp, giant tiger shrimp, Oriental river prawn, swimming crab, offshore greasy back prawn, green tiger prawn and stone crab.

3. An aquaculture feed for fish and shellfish according to claim 2, which is in the form of granules.

4. An aquaculture feed for fish and shellfish according to claim 3, wherein the fish and shellfish are fishes selected from the group consisting of rainbow trout, kokanee, channel catfish, ayu fish, masu trout, Japanese char, Japanese eel, tilapia, carp, young yellowtail, read sea bream, striped beakperch, olive flounder, coho salmon, masu salmon, king salmon and Atlantic salmon, and crustaceans selected from the group consisting of kuruma prawn, Oriental shrimp, giant tiger shrimp, Oriental river prawn, swimming crab, offshore greasy back prawn, green tiger prawn and stone crab.

5. An aquaculture feed for fish and shellfish which consists essentially of (a) a feed that is deficient in the amount of vitamin C required to prevent failure of connective tissue in said fish and shellfish, the α-glucosidase in said feed having been deactivated, by heating the feed and (b) an amount of L-ascorbic acid-2-glucoside effective to prevent failure of connective tissue said amount being from about 2 mg to about 50 g per Kg of said aquaculture feed.

6. An aquaculture feed for fish and shellfish which consisting essentially of (a) a feed that is deficient in the amount of vitamin C required to prevent failure of connective tissue in said fish and shellfish, said feed having been granulated, and (b) an amount of L-ascorbic acid-2-glucoside effective to prevent failure of connective tissue, said amount being from about 2 mg to about 50 g per kg of said aquaculture feed.

7. A method for preventing the failure of connective tissue in fish and shellfish which comprises adding to the aquaculture feed of said fish and shellfish an amount of L-ascorbic acid-2-glucoside sufficient to prevent said failure, said amount being from about 2 mg to about 50 g per kg of said aquaculture feed, and said aquaculture feed being in the form of granules.

8. A method of correcting for vitamin C deficiency in the aquaculture feed of fish and shellfish which comprises adding to a vitamin C deficient feed an amount of L-ascorbic acid-2-glucoside sufficient to correct said deficiency, said amount being from about 2 mg to about 50 g per kg of said aquaculture feed and said aquaculture feed being in the form of granules.

9. A method for preventing the failure of connective tissue in fish and shellfish which comprises adding to the aquaculture feed of said fish and shellfish an amount of L-ascorbic acid-2-glucoside sufficient to prevent said failure, said amount being from about 2 mg to about 50 g per kg of said aquaculture feed, and the α-glucosidase in said aquaculture feed having been deactivated.

10. A method of correcting for vitamin C deficiency in the aquaculture feed of fish and shellfish which comprises adding to a vitamin C deficient feed an amount of L-ascorbic acid-2-glucoside, sufficient to correct said deficiency, said amount being from about 2 mg to about 50 g per kg of said aquaculture feed, and the α-glucosidase in said aquaculture feed having been deactivated by heat prior to the addition of said L-ascorbic acid-2-glucoside.

* * * * *

UNITED STATES PATENT AND TRADEMARK OFFICE
CERTIFICATE OF CORRECTION

PATENT NO. : 5,215,767
DATED : June 1, 1993
INVENTOR(S) : Masakazu Mitsuhashi

It is certified that error appears in the above-identified patent and that said Letters Patent is hereby corrected as shown below:

ON THE TITLE PAGE:

References Cited:

U.S. Patent Documents 3,763,009 to Suzuki et al., delete "10/1983" and substitute thetefor -- 10/1973 --.

Column 5, Table 1, line 22, delete "poyrdoxine" and substitute therefor -- pyridoxine --;

Column 5, Table 2, under the heading of Experimental plot, lines 5, 10 and 15, after Roman numeral "I" insert "*";

Column 7, Table 6, line 18, after "biotin" delete "0.4" and substitute therefor -- 0.14 --;

Column 9, Table 10, line 17, second column after "calciferol 300", delete "(U)" and substitute therefor -- (IU) --;

Column 11, Table 15, line 9, after "thiamine" delete "nitrute" and substitute therefor -- nitrate --; and

UNITED STATES PATENT AND TRADEMARK OFFICE
CERTIFICATE OF CORRECTION

PATENT NO. : 5,215,767

DATED : June 1, 1993

INVENTOR(S) : Masakazu Mitsuhashi

It is certified that error appears in the above-identified patent and that said Letters Patent is hereby corrected as shown below:

Column 12, continuation of Table 17, first line under "Experiemental plot", delete "8." and substitute therefor -- 6. --.

Column 12, line 22, after "deactivated" delete "," and insert "," after "material";

Column 12, line 37, delete "2" and substitute therefor -- 1 --;

Column 12, line 42, delete "read" and substitute therefor -- red --;

Column 12, line 50, delete "consists" and substitute therefor -- consisting --; and

UNITED STATES PATENT AND TRADEMARK OFFICE
CERTIFICATE OF CORRECTION

PATENT NO. : 5,215,767

DATED : June 1, 1993

INVENTOR(S) : Masakazu Mitsuhashi

It is certified that error appears in the above-indentified patent and that said Letters Patent is hereby corrected as shown below:

Column 12, line 53, after "been" insert "heat", after "deactivated" delete "," and after "feed" insert ",".

Signed and Sealed this

Thirty-first Day of May, 1994

Attest:

BRUCE LEHMAN

Attesting Officer

Commissioner of Patents and Trademarks